(No Model.)
S. RICHARD, Jr. & W. N. BLANCHARD.
EYEGLASSES.
No. 492,234.  Patented Feb. 21, 1893.
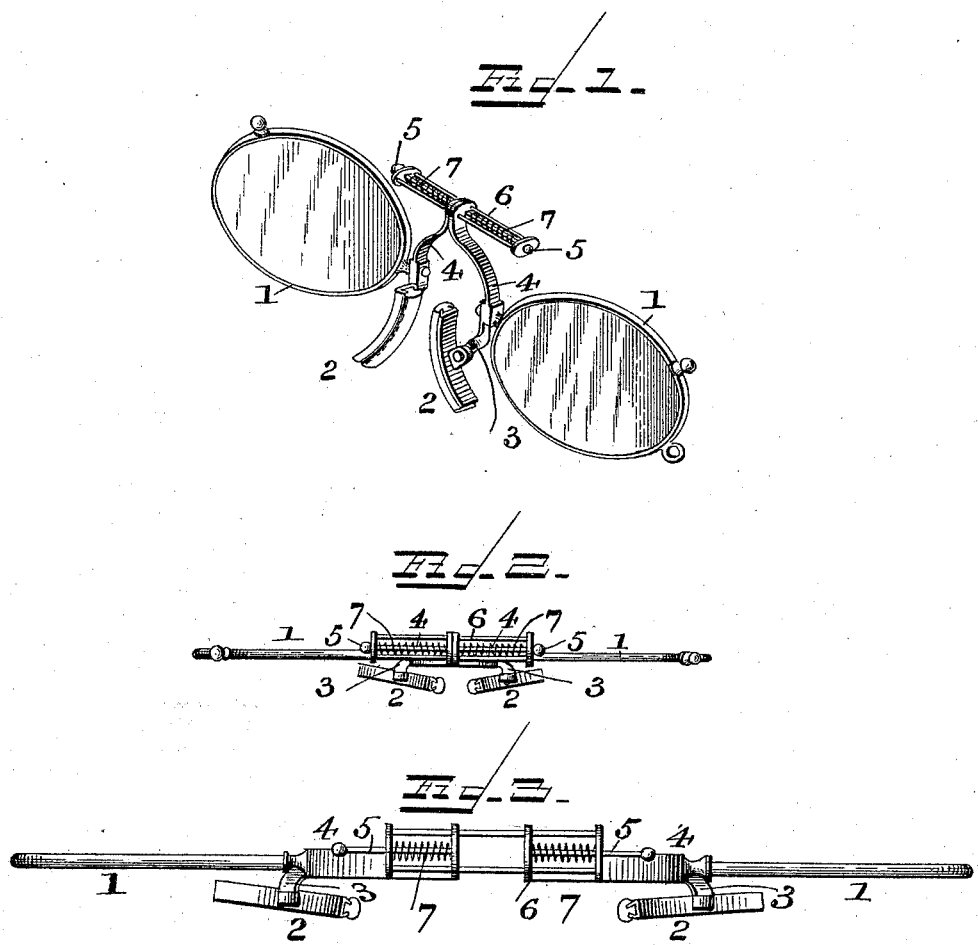
WITNESSES
F. L. Durand
Jb. L. Coombs
INVENTORS:
Stephen Richard Jr & Willie N. Blanchard,
by Louis Bagger & Co
Attorneys

UNITED STATES PATENT OFFICE.

STEPHEN RICHARD, JR., AND WILLIE N. BLANCHARD, OF SOUTHBRIDGE, MASSACHUSETTS.

EYEGLASSES.

SPECIFICATION forming part of Letters Patent No. 492,234, dated February 21, 1893.

Application filed November 4, 1892. Serial No. 450,988. (No model.)

*To all whom it may concern:*

Be it known that we, STEPHEN RICHARD, Jr., and WILLIE N. BLANCHARD, both residents of Southbridge, in the county of Worcester and State of Massachusetts, have invented certain new and useful Improvements in Eyeglasses; and we do hereby declare that the following is a full, clear, and exact description of the invention, which will enable others skilled in the art to which it appertains to make and use the same, reference being had to the accompanying drawings, which form a part of this specification.

Our invention relates to improvements in eye-glasses, in which the frames carrying the lenses are connected together by a spring connection, which allows the lenses to be separated in a straight line and furnishing a superior manner of adjusting the same to the nose.

The invention consists in the novel construction and combination of parts hereinafter fully described and claimed.

In the accompanying drawings: Figure 1 is a perspective view of a pair of eye-glasses constructed in accordance with our invention; Fig. 2 is a plan view. Fig. 3 is a similar view on an enlarged scale showing the frames distended.

In the said drawings, the reference numerals 1, 1, designate the frames comprising two oblong or cylindrical rims of wire in which the lenses are set in the usual manner and are provided with the ordinary nose pieces 2, 2, secured to inwardly extending lugs 3, 3. Also secured to each of these lugs is a curved inwardly extending arm 4, provided with a headed pin 5. These pins pass through apertures in the ends of a rectangular frame 6, and between the ends of the arms and the ends of said frame, are located coiled springs 7, embracing the pins.

The operation will be readily understood: The frames are placed upon the nose in the ordinary manner, the nose-pieces engaging therewith. By means of the springs 7, the frames will be securely held in place and owing to their yielding nature, will allow the lenses to be separated laterally in a straight line, so that they will always be in proper position with respect to the eyes.

There will be other advantages which will be apparent to persons who are compelled to use eye-glasses, and which need not be enumerated here.

Having thus described our invention, what we claim is—

As an improved article a pair of eye-glasses comprising the rims, the lenses, the lugs, the nose pieces secured thereto, the curved upwardly extending arms, the headed pins secured thereto, the rectangular frame through which said pins pass, and the coiled springs embracing said pins, substantially as described.

In testimony that we claim the foregoing as our own we have hereunto affixed our signatures in presence of two witnesses.

STEPHEN RICHARD, JR.
WILLIE N. BLANCHARD.

Witnesses:
JOSEPH N. LAREAU,
ALBERT P. BAYLIES.